No. 866,932.  
PATENTED SEPT. 24, 1907.

A. L. HOOVER.  
COMBINED POTATO ELEVATOR AND VINE SEPARATOR.  
APPLICATION FILED JULY 1, 1907.

2 SHEETS—SHEET 1.

WITNESSES:  
Arthur L. Hoover, INVENTOR  
By C. A. Snow & Co.  
ATTORNEYS.

No. 866,932. PATENTED SEPT. 24, 1907.
A. L. HOOVER.
COMBINED POTATO ELEVATOR AND VINE SEPARATOR.
APPLICATION FILED JULY 1, 1907.

2 SHEETS—SHEET 2.

WITNESSES:
E. F. Stewart
R. M. Elliott

Arthur L. Hoover,
INVENTOR.
By C. A. Snow & Co.
ATTORNEYS

UNITED STATES PATENT OFFICE.

ARTHUR LEWIS HOOVER, OF AVERY, OHIO.

COMBINED POTATO-ELEVATOR AND VINE-SEPARATOR.

No. 866,932.　　　　Specification of Letters Patent.　　　Patented Sept. 24, 1907.

Application filed July 1, 1907. Serial No. 381,782.

*To all whom it may concern:*

Be it known that I, ARTHUR LEWIS HOOVER, a citizen of the United States, residing at Avery, in the county of Erie and State of Ohio, have invented a new and useful Combined Potato-Elevator and Vine-Separator, of which the following is a specification.

This invention has relation to combined potato elevators and vine separators and it consists in the novel construction and arrangement of its parts as hereinafter shown and described.

The object of the invention is to provide an implement of the character indicated which is also provided with means for digging the potatoes and means for conveying the separated potatoes to one side of the implement.

The implement consists primarily of side bars between which are located a series of parallel slats. A digging point is attached to the lower ends of the bars and a conveyer is arranged to move longitudinally of the slats. Said conveyer consists of cross slats attached to side chains and it extends for some distance behind the rear ends of the slats and passes around a hopper supported at the rear end portions of the side bars. The hopper is provided with a conveyer bottom which moves transversely of the implement and is adapted to convey the potatoes to one side thereof. The elevator and conveyer are operatively connected together and the elevator is operatively connected to the ground wheels of the implement.

Figure 1:
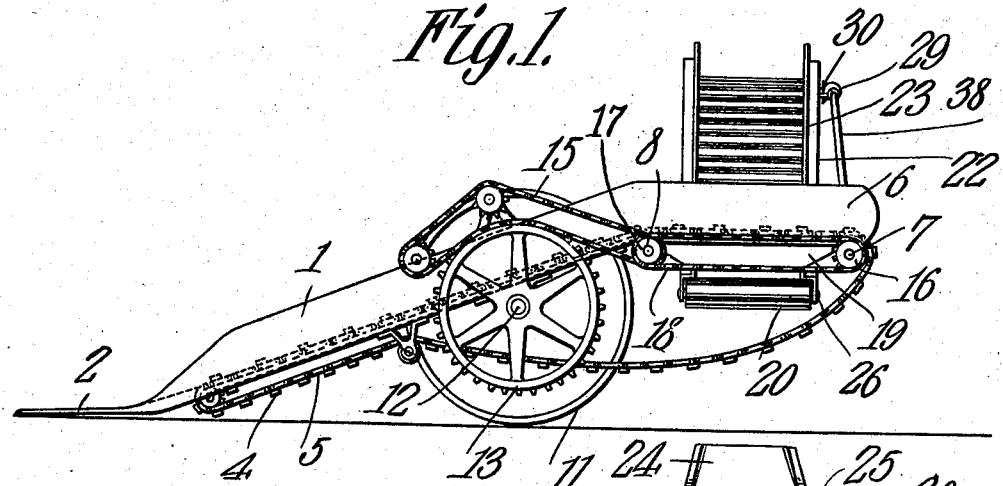
Figure 2:
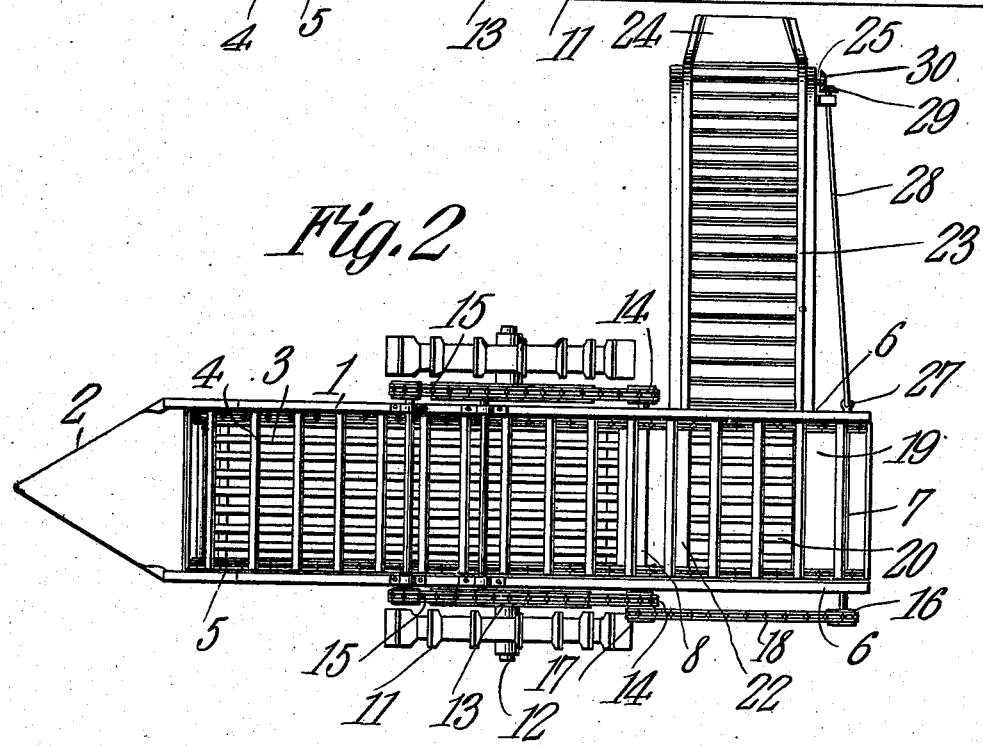
Figure 3:
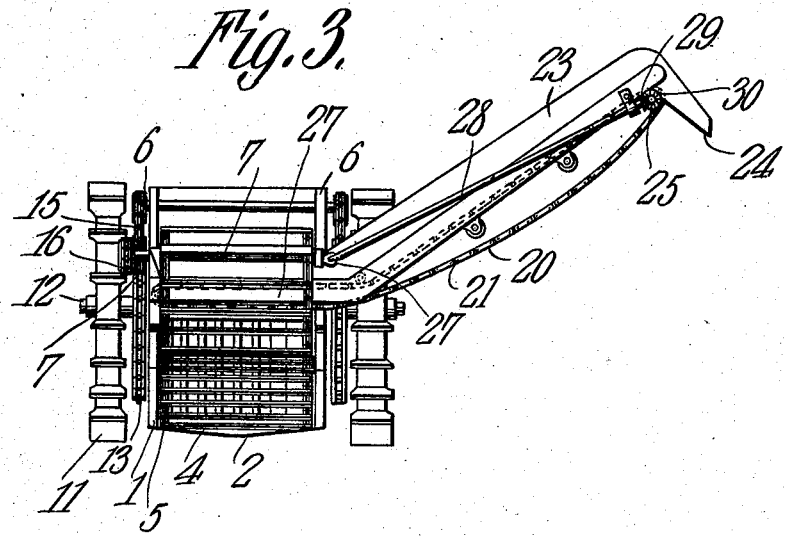
Figure 4:
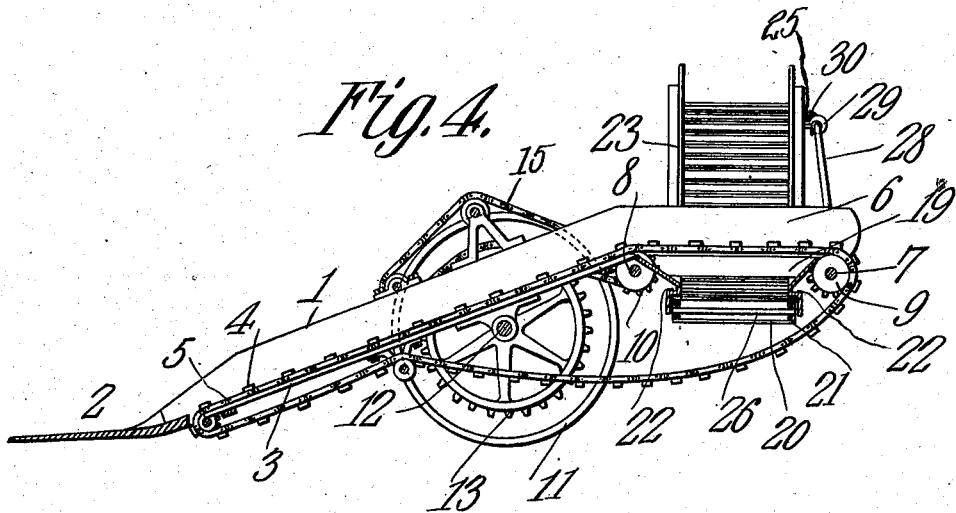

In the accompanying drawing:—Figure 1 is a side elevation of a potato digger with the separator applied thereto. Fig. 2 is a top plan view of the same. Fig. 3 is a rear end elevation of the same, and Fig. 4 is a sectional view of the digger and separator.

The digger consists of the side bars 1 having the digging point 2 attached at their forward ends and the squared slats 3 located between them. The cross slats 4 are attached at their ends to the chains 5 and form a conveyer for elevating the potatoes, vines, weeds, etc. from the ground. The upper rear portions of the side bars 1 are horizontally disposed as at 6 and the shaft 7 is journaled for rotation at the rear ends of the said bars. The shaft 8 is journaled for rotation at the upper portions of the inclination of the side bars 1. The shafts 7 and 8 are provided with sprocket wheels 9 and 10 respectively which are engaged by the chains 5. The bars 1 are mounted upon the axle 12 which in turn is supported by the ground wheels 11. Sprocket wheels 13 rotate with the ground wheels 11 and sprocket wheels 14 are attached to the ends of the shaft 8 and are located in alinement with the sprocket wheels 13. The sprocket chains 15 engage the sprockets of the wheels 13 and pass around the sprocket wheels 14 so that the wheels 14 rotate in the opposite direction from that in which the ground wheels 11 rotate. The shaft 7 is provided with a sprocket wheel 16 and the shaft 8 is provided with a sprocket wheel 17. The sprocket chain 18 passes around the wheels 16 and 17. The hopper 19 is provided with a conveyer bottom 20 which consists of a series of parallel slats supported at their ends by the sprocket chains 21. The sides of the hopper 19 are formed from what is known as Z-iron and consequently they have intermediate horizontal portions 22 which lie over the chains 21. The sides of the hopper 19 lie transversely under the upper portion of the elevator formed by the slats 4 and chains 5. The said sides of the said hopper are inclined upwardly as at 23 and are provided at their upper ends with a chute 24. A shaft 25 is journaled for rotation at the upper ends of the hopper extensions 23 and the chains 21 pass around sprocket wheels provided upon the said shafts; also around sprocket wheels provided upon the shaft 26 which is located at that end of the hopper remote from the inclined extensions 23. The universal joint 27 is attached to the shaft 7 and the shaft 28 connects with one of the members of the said joint and is provided at its outer end with a beveled pinion 29 which meshes with a similar pinion 30 which is attached to the end of the shaft 25.

From the foregoing description it will be seen that the combined elevator and vine separator passes orbitally around the hopper and the inclined slats between the side bars and that the said hopper is provided with a transversely moving potato conveyer for delivering the roots to the side while the vines, weeds, etc., are delivered at the side.

Having described my invention what I claim as new and desire to secure by Letters-Patent is:—

1. In combination with a digger having inclined slats located behind the same, a hopper located behind the slats and having a conveyer bottom, a combined elevator and vine separator moving orbitally around the hopper and the first said slats.

2. In combination with a digger having inclined slats located behind the same, a hopper located behind the slats and having a conveyer bottom which moves transversely of the implement, a combined elevator and vine separator passing orbitally around the hopper and the said slats.

3. In combination with a digger having inclined slats located behind the same, a hopper located behind the slats and having a movable conveyer bottom, a combined elevator and vine separator passing orbitally around the hopper and the slats, means operatively connecting the elevator with the movable hopper bottom and means operatively connecting the elevator with the ground wheels of the implement.

4. An implement as described comprising side bars having inclined forward portions and horizontal rear portions, a digger located between the forward ends of the said bars, shafts journaled at the opposite ends of the horizontal portions of the said bars, ground wheels supporting the bars, means operatively connecting the ground wheels with said shafts, a hopper located under the upper portions of the side bars and having a movable conveyer bottom, means operatively connecting said bottom with one of the said shafts, and a combined conveyer and weed separator passing orbitally around the hopper and between the said bars and around the said shafts.

5. An implement as described comprising side bars having inclined forward portions and horizontal rear portions, ground wheels supporting the bars, a digger attached to the forward ends of the bars, slats located between the bars and which extend along the inclined portions only thereof, a hopper located under the horizontal portions of the said bars and having a movable conveyer bottom, a combined elevator and vine separator passing orbitally around the hopper and the slats, means operatively connecting said elevator and separator with the ground wheel and means operatively connecting the hopper bottom with said elevator and separator.

In testimony that I claim the foregoing as my own, I have hereto affixed my signature in the presence of two witnesses.

ARTHUR LEWIS HOOVER.

Witnesses:
CHAS. E. HARRIS,
FRED A. ROBERTS.